M. R. COLE.
AUTOMOBILE SIGNAL.
APPLICATION FILED AUG. 10, 1917.

1,281,137.

Patented Oct. 8, 1918.

INVENTOR

Marvin R. Cole,

WITNESSES

ATTORNEY

UNITED STATES PATENT OFFICE.

MARVIN R. COLE, OF STEWARTSVILLE, NEW JERSEY.

AUTOMOBILE-SIGNAL.

1,281,137.     Specification of Letters Patent.     Patented Oct. 8, 1918.

Application filed August 10, 1917. Serial No. 185,559.

*To all whom it may concern:*

Be it known that I, MARVIN R. COLE, a citizen of the United States, residing at Stewartsville, in the county of Warren and State of New Jersey, have invented certain new and useful Improvements in Automobile-Signals, of which the following is a specification.

This invention relates to an attachment for an automobile. The principal object of the invention is to provide signal means for indicating to the cars following, the intentions of the driver to slow down, stop, or turn his car.

It is the usual practice, and one required by law in many localities, for the driver to hold out his hand when he is about to stop or turn the car. This necessitates the removal of the hand from the steering wheel, which is objectionable in making a turn, as both hands should be on the steering wheel at this time in order to guide the car around the turn, also in stopping the car the driver has to use both of his hands in manipulating the operating mechanism so that in most cases the driver neglects to signal or holds his hand out for such a slight period of time that the drivers of the cars following usually fail to notice it.

By my invention a signal is set by the driver so that said signal may remain in view for as long a time as desired.

Another object of the invention is to operate this signal by means of an electric motor which is started and stopped by a push button located near the driver's seat, and said signal assuming its inoperative position by gravity when the button is released.

Another object of the invention is to provide a device of the character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which:—

Figure 1 is a side view of an automobile supplied with my invention.

Fig. 2 is a rear view thereof showing the invention in operative position in full lines, and in inoperative position by dotted lines.

Fig. 3 is a detail view of the invention.

In carrying out my invention I locate a small electric motor 1 under the rear seat of the automobile and I provide this motor with a long shaft 2 which extends through the body of the automobile directly above the rear part of the left hand mud guard, at the rear of the machine. I support the outer end of the shaft slightly above the mud guard by means of two eye bolts 3 which pass through the mud guard and are secured thereto by the taps 4. The eye bolts are spaced apart and between them I locate the signal 5, which I prefer to make in the form of a hand. The signal is secured to the shaft by looping the lower end or wrist of the hand around the shaft and clamping it thereon by rivets or the like. The signal is made from a flat piece of material, such as metal, wood, or the like. 6 represents a stop preferably formed from a piece of metal looped around the shaft to the inner side of the innermost eye bolt, and having its ends brought together and clamped by the bolt 7. By loosening this bolt the stop may be adjusted on the shaft. The purpose of this stop is to prevent the signal being raised to a vertical position by the motor as will be hereinafter described. The motor is connected, by means of the wires 8, with the electric plant of the machine or with the battery 9 and the wires extend to a push button 10, located on the steering wheel, which completes the circuit and causes the motor to operate.

The stop is so located on the shaft that it will engage with the mud guard and hold the signal in a position slightly inclined to the vertical, so that as soon as the current to the motor is interrupted the signal will fall rearwardly onto the mud guard by gravity. When the driver wishes to stop the car or to round a turn he operates the push button which will complete the circuit and cause the motor to start to revolve, thus the shaft will be rotated and the signal removed from the position shown in dotted lines in Figs. 1 and 2 to the position shown in full lines in said figures. The stop, as before stated, prevents further movement of the signal. As soon as pressure on the button is released, the circuit through the motor will be broken and the signal will fall on the mud guard as before stated.

It will thus be seen that the signal can be given with the least possible effort and without requiring the driver to remove his hands from the steering wheel, as he can operate the button by one of his fingers or thumb while still holding on to the steering wheel. The signal can be readily seen from the rear and it may be held in operative position as long as it is desired.

It is thought from the foregoing that the advantages and novel features of my invention will be readily apparent.

I desire it to be understood that I may make slight changes in the construction, and in the combination and arrangement of the several parts, provided that such changes fall within the scope of the appended claims.

I claim as my invention.

1. In an automobile signal, the combination with an electric motor disposed within the car body and having a shaft projecting through one side of the same over the rear mud-guard, and a circuit leading from said motor through a source of energy to a push button within reach of the driver; of a signal mounted rigidly on said shaft, and a stop also mounted rigidly on the shaft and limiting the rotation of the latter by its contact with said mud-guard.

2. In a rotary automobile signal, the combination with an electric motor having a shaft projecting over the rear mud-guard, and a circuit leading from said motor through a source of energy to a push button within reach of the driver; of bearings on the mud-guard in which said shaft is journaled, a signal fast on the shaft adjacent the innermost bearing, and a stop also on the shaft adapted to be set so as to limit the rise of said signal when the current is on but to permit its automatic descent when the current is off.

3. A signal means for automobiles comprising a signal, hinge means connecting the same to one of the mud guards, a stop for holding the signal at an incline to the vertical so that said signal will drop to idle position by gravity, a motor for raising the signal, the latter and said stop being mounted fast on the motor shaft and means for operating the motor from the driver's seat.

In testimony whereof I affix my signature in presence of two witnesses.

MARVIN R. COLE.

Witnesses:
M. E. DOWLING,
WARREN H. DOWLING.